D. H. FRANCIS.
VALVE CONSTRUCTION.
APPLICATION FILED JAN. 17, 1919.
1,340,481. Patented May 18, 1920.
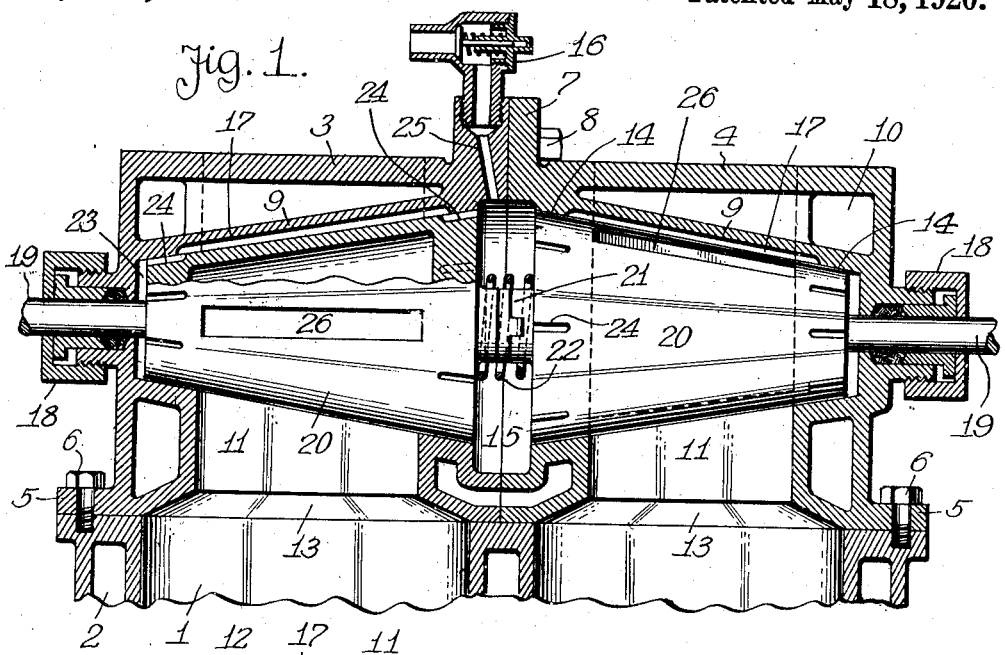
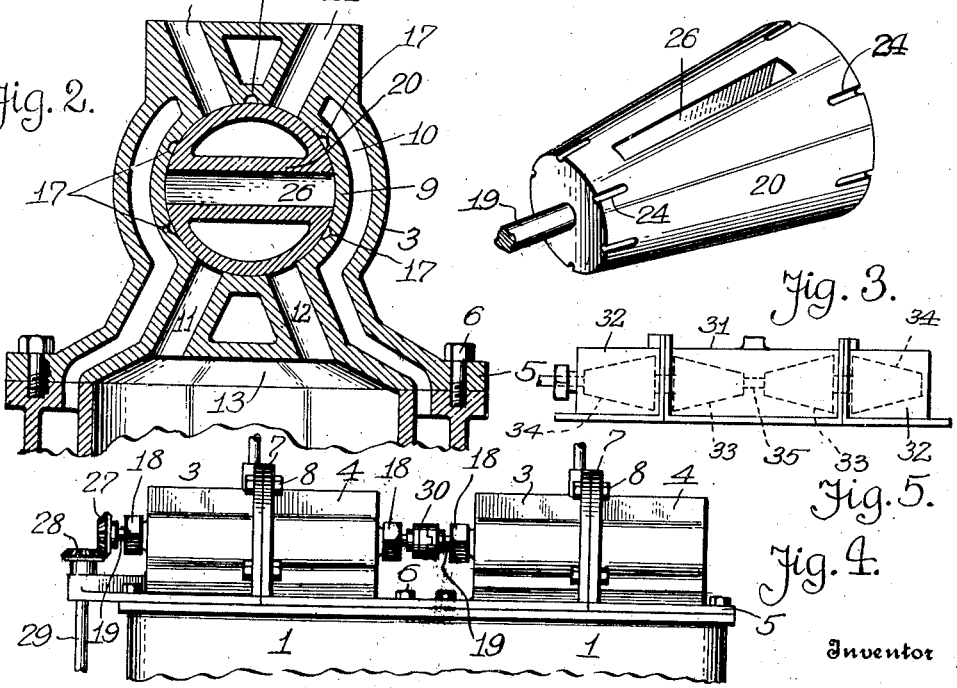
Witness
Chas. W. Stauffer
Karl H. Butler
Inventor
Daniel H. Francis,
By
Attorneys

UNITED STATES PATENT OFFICE.

DANIEL H. FRANCIS, OF DETROIT, MICHIGAN.

VALVE CONSTRUCTION.

1,340,481.  Specification of Letters Patent.  Patented May 18, 1920.

Application filed January 17, 1919. Serial No. 271,565.

*To all whom it may concern:*

Be it known that I, DANIEL H. FRANCIS, a citizen of the United States of America, residing at Detroit, in the county of Wayne and State of Michigan, have invented certain new and useful Improvements in Valve Construction, of which the following is a specification, reference being had therein to the accompanying drawings.

This invention relates to valve construction and has special reference to a valve mechanism that may be advantageously used in connection with internal combustion engines, and which possesses the following characteristics.

First, my invention is characterized by valves that may be used in sets or pairs and as such serve a twin cylinder engine, a four cylinder engine, or an engine of any number of cylinders, the valves being articulated for operation in synchronism.

Second, my invention includes a single rotary valve having the ends thereof packed, and cushioned by a liquid which serves as a non-compressible cushioning agent to receive any end thrust or stresses and strains on the valve, due to explosive forces to which it may be subjected or the manner in which movement may be imparted to it.

Third, my invention includes a tapering rotary valve with novel means for circulating a lubricant on all bearing surfaces, and particularly at the ends, without any danger of the lubricant being wasted or gritty matter tending to cut the bearing surfaces of the valve.

Fourth, my invention is further characterized by the simplicity of construction which permits of parts being easily and quickly assembled, manufactured at comparatively small cost and readily maintained in an operative condition.

The above are a few of the important features of my invention and others will appear as the nature of the invention is better understood, so reference will now be had to the drawing, wherein—

Figure 1 is a vertical longitudinal sectional view of a portion of an internal combustion engine showing the valve construction;

Fig. 2 is a cross sectional view of the valve construction;

Fig. 3 is a perspective view of a removed valve;

Fig. 4 is a side elevation of a portion of a four cylinder internal combustion engine provided with a valve construction in accordance with this invention, and Fig. 5 shows another arrangement of valves.

In order that a single valve as well as a plurality of the valves may be understood, I have illustrated a set or pair of the valves in connection with a twin cylinder engine having cylinders 1 and suitable spaces 2 for a cooling agent. On the upper ends of the cylinders 1 is mounted a two-part or sectional head composed of sections 3 and 4 having lateral flanges 5 bolted or otherwise connected, as at 6, to the upper end of the cylinder block. The head sections 3 and 4 have the confronting ends thereof provided with flanges 7 and these flanges are adapted to be connected as at 8, so that the sections 3 and 4 are as though integral.

Each head section is formed with a tapering valve body 9 surrounded by a water space 10 communicating with the spaces 2 of the cylinder block and communicating with the valve body 9 are angularly disposed intake and exhaust ports 11 and 12, said ports being walled through the spaces 10 with the axes of said ports intersecting the longitudinal axis of the valve body 9, as best shown in Fig. 2. The upper ends of the ports 11 and 12 are adapted to communicate with suitable intake and exhaust manifolds and the lower ends of said ports communicate with a cylinder cavity 13 in the bottom of the head section, said cavity providing a closing dome for the cylinder 1.

The tapering valve bodies 9 have the large ends thereof disposed end to end, as best shown in Fig. 1 and these valve bodies provide tapering seats 14 with a lubricant or cushion chamber 15 therebetween. The tapering seats of the valve bodies have longitudinal lubricating grooves or channels 17, which as shown in Fig. 2 may be distributed around said seats so as to establish communication between the outer and inner ends of said seats and insure a thorough oiling of the inner walls or seats of the valve bodies.

The outer ends of the head sections 3 and 4 are provided with stuffing boxes 18 of a conventional form for the valve rods 19 of tapering or conical rotary valves 20. These valves are necessarily disposed with the large ends thereof confronting each other at the lubricant chamber 15, and the large ends of said valves have axial interlocking members 21 to establish a driving relation between said valves. The members 21 may be interlocked by a tongue and groove connection, by clutch faces or any other mechanical means so that said valves may have longitudinal movement independent of each other, if necessary. The members 21 are encircled by a coiled compression spring 22 having its large convolutions bearing against large ends of the valves so as to maintain said valves normally seated in the valve bodies 9.

The small ends of the valves 20 are in spaced relation to the outer ends of the head sections 3 and 4, thereby providing lubricant chambers 23 at the small ends of said valves. These small lubricant chambers 23 are adapted to receive lubricant from the large central chambers 15 through the medium of the grooves 17 and a series of grooves 24 in the large and small ends of each of the valves 20, the said grooves 24 being disposed other than in a plane of any of the ports in the valves 20. The small grooves 24 are circumferentially disposed about the large and small ends of the valves 20 and said small grooves are adapted to have the inner ends thereof communicate with the ends of the grooves 17 and thus permit of the lubricant in the chamber 15 flowing into the chambers 23 and distributed upon the valve bodies 9.

The lubricant is supplied to the chamber 15 through a suitable passage 25 in the flange 7 of the head section 3 and the lubricant may flow therein by gravity or be under forced feed. The conventional form of check valve 16 may be placed in the passage 25 to prevent the back flow of the lubricant.

Each valve 20, which is preferably hollow, has a walled transverse port or slot 26 which are brought into registration with the intake and exhaust ports 11 and 12 of the head sections 3 and 4 in the proper time, so that the cylinders may receive an explosive mixture and exhaust burned gases according to the cycle of the engine. During the rotation of the valve, the ports 26 may register with the groove 17, but during such communication the lubricant in the groove 17 is cut off from the main supply by reason of the groove 24 being out of longitudinal alinement with the ports 26, consequently no lubricant under pressure, can enter the ports 26. The small quantities trapped in the groove 17 may enter the ports 26, but such lubricant is not under pressure nor of any great quantity.

As an instance of operating means for a pair of valves, one or both of the valve rods 19 may be provided with a beveled gear wheel 27 meshing with a similar wheel 28 on the driven shaft 29, as shown in Fig. 4, and when the valve construction is associated with a four cylinder engine, the alining valve rods 19 may be coupled together as at 30, thus permitting of a series of valves being rotated about a common axis and all of said valves rotated in timed relation to the piston strokes within the engine.

In Fig. 5 there is illustrated a modified form of cylinder head or a different arrangement of conical valves for serving a multi-cylinder internal combustion engine. The head in this instance comprises a central section 31 and end sections 32, said sections being suitably connected together. In the central section 31 conical valves 33 are disposed with the small ends thereof in confronting relation and these ends may be suitably articulated so that the valves may be driven in unison. Confronting the outer large ends of the valves 33 are other valves 34 coöperating with the valves 33 in providing a valve arrangement such as shown in Fig. 1. This constructive arrangement of parts obviates the necessity of using stuffing boxes 18 and coupling 30 shown in Fig. 4, as it is only necessary to provide the head section 31 with tapering valve seats communicating with each other by an opening 35 that permits of the valves 33 being coupled together by a pin and socket joint or any other mechanical connection that will establish a driving relation between said valves. Suitable provision is made for ports, lubricant passages and other refinements of my invention as before recited.

It is thought that the operation and utility of the valve construction will be apparent without further description, and while in the drawing there is illustrated a preferred embodiment of my invention, it is to be understood that the structural elements are susceptible to such variations and modifications as fall within the scope of the appended claims.

What I claim is:—

1. A valve construction comprising valve bodies having intake and exhaust ports and lubricant receiving grooves, rotary valves in said bodies and coöperating therewith in providing a central and end lubricant chambers, said chambers adapted to receive lubricant under pressure, and said rotary valves being ported to communicate with the intake and exhaust ports of the valve bodies and grooved to establish communication between the central and end chambers of said valve body and the grooves thereof, the position of the valve grooves being such that at no time do the ports of the valves receive lubricant under pressure from the grooves or chambers of the valve bodies, and means articulating said valves within the central chamber.

2. A valve construction as characterized in claim 1, and wherein the valve bodies and valves are tapered with the large ends of said valves forming opposed walls of said central chambers.

3. A valve construction as characterized in claim 1 and wherein the valves are rotated from the outer end of one valve, and means located in the central chamber for maintaining said valves seated.

4. A valve construction as characterized in claim 1 and wherein the grooves of the ported valves are in the ends of said valves and out of longitudinal alinement with the ports of said valves and the grooves in the valve bodies are disposed so that the inner ends of the valve grooves may communicate with the outer ends of the valve body grooves and establish communication between the end and central lubricating chambers and serve to lubricate surfaces of the valves.

5. A valve construction comprising tapering valve bodies disposed end to end, rotary valves in said valve bodies and confronting each other to provide a central chamber, and a coiled spring between said valves in said chamber and having its end convolutions bearing against the confronting ends of said valves and maintaining said valves normally seated in said valve bodies.

6. A valve construction for internal combustion engines, ported head sections on the cylinders of the internal combustion engine, ported rotary valves in said sections and having axial driving means and means maintaining a lubricating agent under pressure between said valves to maintain said valves normally seated.

7. In a valve construction for internal combustion engines, ported head sections on the cylinders of the engine, ported rotary valves in said sections and having axial driving means, said valves coöperating with the head sections and with each other in providing central and end lubricant chambers, the central chamber having a lubricant constantly under pressure therein, and means adapted to establish communication between said chambers without lubricant under pressure entering the ports of the ported rotary valve.

8. In a valve construction for internal combustion engines, the combination of tapering valve bodies, tapering rotary valves in said valve bodies and having the small ends coöperating therewith in providing end lubricant chambers and the large ends coöperating to form a central lubricant chamber, said valves and valve bodies being grooved to establish communication between said end and central chambers, and means articulating said valves in said central chamber.

9. The combination set forth in claim 8, and wherein the valves are axially driven from one end and maintained seated by means in said central chamber.

10. In a multi-cylinder engine, cylinder heads, conical valves in said heads serving the engine cylinders and disposed in a common axis and in sets with the large ends of the valves confronting to provide a central cushioning chamber and the small ends of said valves coöperating with said heads in providing end cushioning chambers, and means connecting all of said valves for operation in synchronism.

11. In a multi-cylinder engine, as characterized in claim 10, and wherein one means supplies all of said cushioning chambers with a cushioning agent.

12. In a multi-cylinder engine, as characterized in claim 10, and wherein means between the valves of each set maintains said valves normally seated in said heads.

In testimony whereof I affix my signature in the presence of two witnesses.

DANIEL H. FRANCIS.

Witnesses:
KARL H. BUTLER,
ANNA M. DORR.